United States Patent
Jung

(10) Patent No.: US 12,254,052 B2
(45) Date of Patent: Mar. 18, 2025

(54) DEVICE, SYSTEM AND METHOD FOR PROVIDING WISH LIST- TO-CONTENT MATCHING SERVICE

(71) Applicant: Chang Soo Cho, Seoul (KR)

(72) Inventor: Jee Hoo Jung, Seoul (KR)

(73) Assignee: Chang Soo Cho, Seoul (KR)

( * ) Notice: Subject to any disclaimer, the term of this patent is extended or adjusted under 35 U.S.C. 154(b) by 140 days.

(21) Appl. No.: 18/091,805

(22) Filed: Dec. 30, 2022

(65) Prior Publication Data

US 2024/0220552 A1    Jul. 4, 2024

(51) Int. Cl.
G06F 16/9532    (2019.01)
G06F 16/9538    (2019.01)
G06F 40/279    (2020.01)

(52) U.S. Cl.
CPC ...... *G06F 16/9532* (2019.01); *G06F 16/9538* (2019.01); *G06F 40/279* (2020.01)

(58) Field of Classification Search
CPC .......................... G06F 16/9532; G06F 16/9538
See application file for complete search history.

(56) References Cited

U.S. PATENT DOCUMENTS

2011/0231770 A1* 9/2011 Tovar .................. G06F 21/6218
                                                                  715/736

FOREIGN PATENT DOCUMENTS

| KR | 10-2015-0062541 A | 6/2015 |
| KR | 10-1755254 B1 | 7/2017 |
| KR | 10-2018-0099099 A | 9/2018 |

OTHER PUBLICATIONS

Wishing Note YouTube video, "How to Achieve What You Want by Using the Power of Attraction?? Start Managing Your Bucket List with Wishing Note." May 7, 2020 (https://www.youtube.com/watch?v=dl1T1VEh9is&t=2s).

* cited by examiner

*Primary Examiner* — Baoquoc N To
(74) *Attorney, Agent, or Firm* — Bridgeway IP Law Group, PLLC; Jihun Kim

(57) ABSTRACT

Provided is a method for providing a wish list-to-content matching service through a communication linkage between a device and a server. The present method includes a process of receiving, by the server, wish information including text and images regarding a user's wish list from the device, a process of generating, by the server, keyword information by analyzing morphemes of the text included in the wish information and generating, by the server, content information corresponding to the keyword information, and a process of generating, by the server, a double-sided wishing card including a front surface region configured based on the wish information and a back surface region configured based on the content information and providing the double-sided wishing card to the device.

16 Claims, 12 Drawing Sheets

DEVICE, SYSTEM AND METHOD FOR PROVIDING WISH LIST- TO-CONTENT MATCHING SERVICE

TECHNICAL FIELD

The present disclosure relates to a device, system and method for providing a wish list-to-content matching service and more particularly, to a device, system and method capable of matching content information to a user's wish list including the user's wishes and objectives by analyzing keywords in the wish list and recommending, as information desired by the user, the content information to the user through a wishing card interface, and systemically managing the user's wish list by providing a solution for fulfilling the user's wish list.

BACKGROUND

With the growth of Internet technology and smartphone proliferation, smartphone users can record their own objectives or wish list using their portable devices such as smartphones. In line with this trend, various scheduling-related mobile applications have been released, and the users have managed their own To-Dos or objectives using the mobile applications. However, such scheduling-related mobile applications provide a user with a function of recording To-Dos or a wish list and a notification function on a one-time basis, but do not systemically manage the wish list in order for the user to fulfill the wish list or do not provide any solution for fulfilling the user's wish list.

Meanwhile, a social network service, a search engine site and the like have provided a customized advertisement service advertising a product or content of an affiliate by considering a user's age, interest and the like. However, the conventional customized advertisement service provides the user with an advertisement of a product or content based on pieces of information such as the user's age and recent search term and thus is limited in providing an advertisement of a product or content most suitable for the user. Also, the user may have inconvenience of having to frequently receive advertisements or push notifications of products or content which the user does not want.

Therefore, the user needs a service that provides the user with, as a solution, information, content or an advertisement related to the user's current wish by analyzing the user's wish list, and a product or content supplier needs a platform that can accurately target content supplied by the supplier at most potential consumers and efficiently perform advertising.

SUMMARY

The present disclosure is conceived to solve the problem described above, and provides a device, system and method capable of matching content information to a user's wish list including the user's wishes and objectives by analyzing keywords in the wish list and recommending, as information desired by the user, the content information to the user through a wishing card interface, and systemically managing the user's wish list by providing a solution for fulfilling the user's wish list.

The problems to be solved by the present disclosure are not limited to the above-described problems. There may be other problems to be solved by the present disclosure.

As a technical means for solving above-described technical problem, a first aspect of the present disclosure provides a method for providing a wish list-to-content matching service through a communication linkage between a device and a server. The present method includes a process of receiving, by the server, wish information including text and images regarding a user's wish list from the device, a process of generating, by the server, keyword information by analyzing morphemes of the text included in the wish information and generating, by the server, content information corresponding to the keyword information, and a process of generating, by the server, a double-sided wishing card including a front surface region configured based on the wish information and a back surface region configured based on the content information and providing the double-sided wishing card to the device.

Further, a second aspect of the present disclosure provides a method for providing a wish list-to-content matching service using a device. The present method includes a process of generating, by the device, keyword information based on input wish information including text and images regarding a user's wish list by analyzing morphemes of the text included in the wish information and generating, by the device, content information corresponding to the keyword information, and a process of generating, by the device, a double-sided wishing card including a front surface region configured based on the wish information and a back surface region configured based on the content information and displaying the double-sided wishing card.

Furthermore, a third aspect of the present disclosure provides a system for providing a wish list-to-content matching service through a communication linkage to a device. The present system includes a communication module that transmits and receives information to and from the device, a memory that stores a wish list management and content matching program, and a processor that executes the program stored in the memory. The processor is configured to execute the wish list management and content matching program to receive wish information including text and images regarding a user's wish list from the device, generate keyword information by analyzing morphemes of the text included in the wish information, generate content information corresponding to the keyword information, generate a double-sided wishing card including a front surface region configured based on the wish information and a back surface region configured based on the content information, and provide the double-sided wishing card to the device.

Moreover, a fourth aspect of the present disclosure provides a device for providing a wish list-to-content matching service. The present device includes an input/output module, a memory that stores a wish list management and content recommendation program, and a processor that executes the program stored in the memory. The processor is configured to execute the wish list management and content recommendation program to generate keyword information based on wish information including text and images regarding a user's wish list input through the input/output module by analyzing morphemes of the text included in the wish information, generate content information corresponding to the keyword information, generate a double-sided wishing card including a front surface region configured based on the wish information and a back surface region configured based on the content information, and display the double-sided wishing card through the input/output module.

According to the present disclosure, keywords included in a user's wish list including the user's wishes and objectives can be analyzed through keyword analysis and provision of customized information based on artificial intelligence, and, thus, it is possible to recommend, as information desired by the user, content information corresponding and matched to the wish list to the user through a wishing card interface.

Further, according to the present disclosure, a user can receive information about content desired by himself or herself, and a supplier that supplies the content can target the content at most potential consumers and perform advertising efficiently.

Furthermore, according to the present disclosure, it is possible to provide various functions, such as a promise function, a reward function and a step writing function, that enable a user to systemically manage his or her wishes or objectives set by himself or herself based on text and images regarding the wishes or objectives.

Moreover, according to the present disclosure, it is possible to provide a space where users can search and read other users' wish information and can communicate with each other by sharing their own wishes or objectives.

BRIEF DESCRIPTION OF THE DRAWINGS

In the detailed description that follows, embodiments are described as illustrations only since various changes and modifications will become apparent to a person with ordinary skill in the art from the following detailed description. The use of the same reference numbers in different figures indicates similar or identical items.

DETAILED DESCRIPTION

Figure 1:
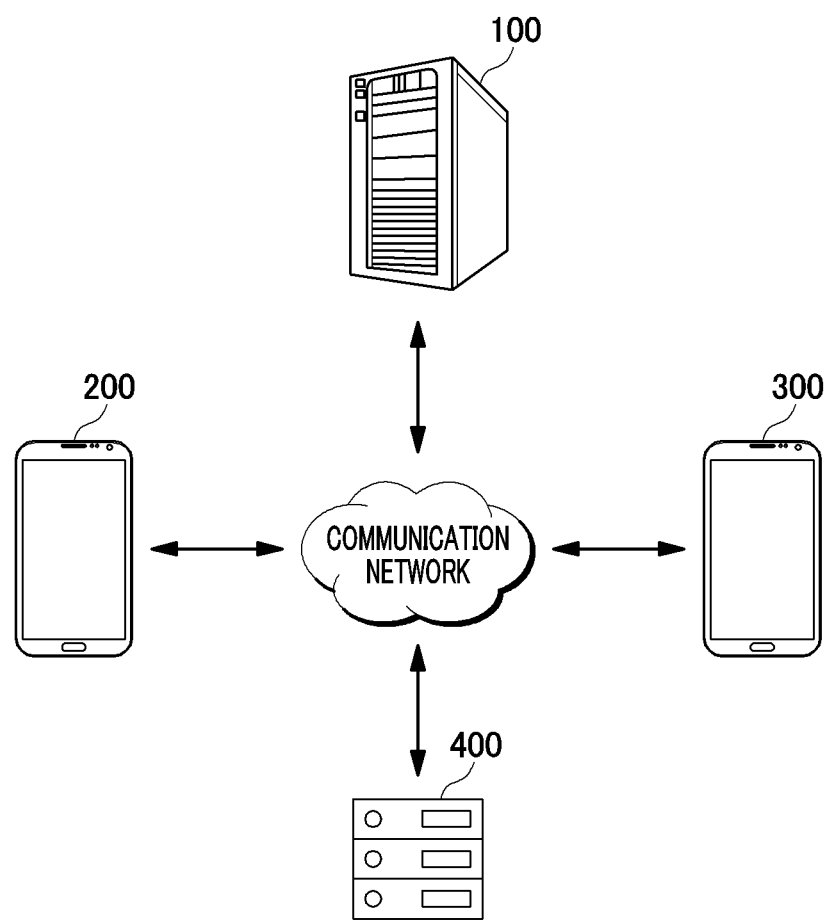
FIG. 1 is a schematic diagram illustrating a wish list-to-content matching service providing system and devices each having a communication linkage to the system according to an embodiment of the present disclosure.

Hereafter, embodiments will be described in detail with reference to the accompanying drawings. However, it is to be noted that the present disclosure is not limited to the embodiments but can be embodied in various other ways. Also, the drawings are provided to help the understanding of the embodiments of the present disclosure, not limiting the scope of the present disclosure. Unless defined differently, all terms used herein, which include technical terminologies or scientific terminologies, have the same meaning as that understood by a person with ordinary skill in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined herein.

In the drawings, parts irrelevant to the description are omitted for the simplicity of explanation, and the size, form, and shape of each component shown in the drawings may be variously modified. Like reference numerals refer to like elements throughout the specification.

Further, the suffixes "module" and "unit" used for components disclosed in the following description are merely given or interchangeably used to facilitate a description of the specification, and the suffix itself does not give any special meaning or function. Also, in describing the embodiments presented herein, the detailed description will be omitted when a specific description for publicly known technologies to which the present disclosure pertains is judged to obscure the gist of the embodiments presented herein.

Throughout the specification, in a case where one component is described as being "connected (joined, in contact with, or coupled)" to another component, such a description includes both a case where one component is "connected (joined, in contact with, or coupled)" directly to another component and a case where one component is "connected (joined, in contact with, or coupled)" indirectly to another component with still another component disposed between one component and another component. Unless explicitly described to the contrary, the term "comprise (include or have)" will be understood to imply the inclusion of stated components but not the exclusion of any other components.

It will be understood that, although the terms "first and second" used herein may be used to describe various components, the components should not be limited by these terms. The terms are only used to distinguish one component from another component. For example, a first component can be termed a second component, and, similarly, a second component can be termed a first component, without departing from the scope of the present disclosure. Singular forms used herein includes plural forms as well unless the context clearly indicates otherwise.

A communication module to be described below may include a device which includes hardware and software needed to transmit and receive signals, such as control signals or data signals, through wired and/or wireless connection with another network device. A memory to be described below may store at least one of information and data input into the communication module, information and data needed for functions performed by a processor, and data generated when the processor performs the functions. The memory may collectively refer to a non-volatile storage device that retains information stored therein even when power is not supplied and a volatile storage device that requires power to retain information stored therein. Also, the memory may function to temporarily or permanently store data processed by the processor. The memory may further include magnetic storage media or flash storage media in addition to the volatile storage device that requires power to retain information stored therein, but the present disclosure is not limited thereto. The processor to be described below may include various types of devices capable of controlling and processing data. The processor may be a data processing device built in hardware and having a physically structured circuit to execute a code included in a program or a function expressed in a command. For example, the processor may be implemented as a microprocessor, a central processing unit (CPU), a processor core, a multiprocessor, an application-specific integrated circuit (ASIC) and a field programmable gate array (FPGA), but the present disclosure is not limited thereto.

FIG. 1 is a schematic diagram illustrating a wish list-to-content matching service providing system 100 and devices 200 and 300 each having a communication linkage to the system according to an embodiment of the present disclosure.

Referring to FIG. 1, the wish list-to-content matching service providing system 100 may transmit and receive information to and from a service user device 200 and a supplier device 300 of a content supplier or advertisement supplier through a communication network. The wish list-to-content matching service providing system 100 may receive, from the user device 200, wish information including information about wishes, objectives and a wish list of a user, and may receive, from the supplier device 300, content information and advertisement information. The wish list-to-content matching service providing system 100 may analyze the wish information to match content information corresponding to the wish information and provide the content information to the user through the user device 200. In this case, the wish list-to-content matching service providing system 100 can analyze text included in the wish information using natural language processing to extract a keyword and match content corresponding to the keyword using artificial intelligence and thus can provide the user with content most suitable for the wish list and provide the content and advertisement supplier with a chance to accurately target content supplied by himself or herself at potential consumers and efficiently perform advertising. Also, the wish list-to-content matching service providing system 100 may transmit and receive information to and from an external server 400. Herein, the external server 400 may be database that stores content and advertisements, a social network service system to which content and advertisements are uploaded, and the like.

The wish list-to-content matching service providing system 100 may be configured as an apparatus such as the server or devices 200 and 300, and may operate in a cloud computing service model such as Software as a Service (SaaS), Platform as a Service (PaaS) or Infrastructure as a Service (IaaS). Also, the wish list-to-content matching service providing system 100 may be configured as a server such as a private cloud system, a public cloud system or a hybrid cloud system.

The devices 200 and 300 may include, for example, a notebook, a desktop, and a laptop equipped with a WEB browser, wireless communication devices that ensure portability and mobility, or all kinds of handheld-based wireless communication devices such as a smartphone, a tablet PC and the like. Further, the communication network illustrated in FIG. 1 may be implemented as wired networks such as a Local Area Network (LAN), a Wide Area Network (WAN) or a Value Added Network (VAN) or all kinds of wireless networks such as a mobile radio communication network or a satellite communication network.

Figure 2:
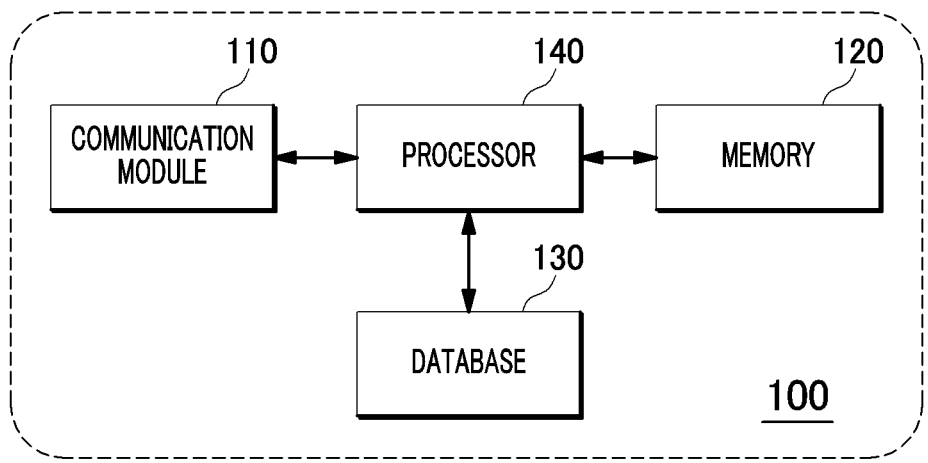
FIG. 2 is a block diagram illustrating a configuration of the wish list-to-content matching service providing system illustrated in FIG. 1.

FIG. 2 is a block diagram illustrating a configuration of the wish list-to-content matching service providing system 100 illustrated in FIG. 1.

Referring to FIG. 2, the wish list-to-content matching service providing system 100 includes a communication module 110 that transmits and receives information to and from a device, a memory 120 that stores a wish list management and content matching program, and a processor 140 that executes the program stored in the memory 120, and may further include a database 130. Herein, the device may refer to the user device 200 illustrated in FIG. 1. The name of the program is set for the convenience of description, but does not limit the functions of the program. The database 130 may be a location where data used by the wish list-to-content matching service providing system 100 are stored. For example, the database 130 may be a location where meta-information and big data for semantic analysis on input data including text such as semantic information of words, similarity information between words and proximity information between words are stored. The database 130 may serve as part of the memory 120, but is not necessarily located inside the wish list-to-content matching service providing system 100 and may be located outside the wish list-to-content matching service providing system 100.

The processor 140 is configured to execute the wish list management and content matching program to perform the following functions and processes.

The processor 140 receives wish information including text and images regarding the user's wish list from the device and generates keyword information by analyzing morphemes of the text included in the wish information. Also, the processor 140 generates content information corresponding to the keyword information. The processor 140 generates a double-sided wishing card including a front surface region configured based on the wish information and a back surface region configured based on the content information and provides the double-sided wishing card to the device. Herein, the wish information may include description information, associated image information and achievement plan schedule information regarding the user's wish list. The front surface region may include a text region where the description information is located, an image region where the associated image information is located, and a schedule region where the achievement plan schedule information is located. The content information may include advertisement information supplied from another device, e.g., the supplier device 300, different from the above-described device.

The processor 140 may extract a keyword by analyzing morphemes of the text included in the wish information. In this case, if words included in the text are neologisms or terms conventionally used in a specific field, the keyword may not be extracted well. Therefore, the processor 140 may store neologisms, slangs, names of people, titles of movies, names of brands, names of places, buzzwords and the like in the memory 120 based on the external server 400 such as a social network service or the like. For example, the wish list-to-content matching service providing system 100 may provide a separate interface such as an administrator web page or the like and may receive and store words, such as "Cobb salad", "sangria" and "flower pot", which are not previously registered through the interface. The stored words may be matched to meanings as in a dictionary. Also, similarly to keywords extracted by the processor 140, the stored words may be used later to match content corresponding to a keyword.

The processor 140 may generate a wish list text interface including a region for writing a description of the user's wish list and provide the wish list text interface to the device, and may receive, from the device, description information regarding the user's wish list written in the region for writing a description of the user's wish list through the wish list text interface. The processor 140 may generate a wish list image interface including a region for uploading images of the user's wish list and provide the wish list image interface to the device, and may receive, from the device, associated image information regarding the user's wish list uploaded to the region for uploading images of the user's wish list through the wish list image interface. Further, the processor 140 may generate a wish list schedule interface including a region for writing an achievement plan schedule of the user's wish list and provide the wish list schedule interface to the device, and may receive, from the device, achievement plan schedule information regarding the user's wish list uploaded to the region for writing an achievement plan schedule of the user's wish list through the wish list schedule interface. The processor 140 may generate a card generation interface including a region for selecting a wishing card generation button and provide the card generation interface to the device, and may receive, from the device, inputs to select the region for selecting a wishing card generation button for a predetermined period of time. The above-described interfaces will be described below in more detail with reference to FIG. 4 through FIG. 7.

The processor 140 may extract keywords by analyzing morphemes of the text included in the description information of the wish list using natural language processing. The processor 140 may calculate the degree of proximity between the extracted keywords based on a predetermined keyword proximity score. The processor 140 may generate a combined keyword by combining keywords having a predetermined proximity score or more among keywords located within a predetermined interval from each other in the text and set the combined keyword as keyword information. The processor 140 may generate content information corresponding to the keyword information using an artificial intelligence model trained to generate content information corresponding to a specific keyword when the specific keyword is input.

The keyword proximity score may be set previously and stored in the memory 120 or the database 130. An example of a method of calculating the keyword proximity score is as follows. First, the proximity score may be calculated based on the frequency of keywords present within a predetermined interval from each other in the text based on a number of text data. For example, based on text data such as "I would like to enjoy travel to Rome by plane, and particularly, I would love to travel to famous restaurants", a proximity score between Rome and travel may be calculated as 9 out of 10, a proximity score between famous restaurants and travel may also be calculated as 9, a proximity score between plane and Rome may be calculated as 8, and a proximity score between Rome and famous restaurants may be calculated as 7. Based on this method, a keyword proximity score data table, a list and the like can be compiled.

According to another example of a method for keyword proximity score, keywords extracted from the same sentence may be determined to have a high degree of proximity therebetween. For example, if keywords extracted from sentence 1 are "A, B and C" and keywords extracted from sentence 2 are "A, B and D", a keyword proximity score between "A" and "B" may be set higher than a keyword proximity score between "A and C" and a keyword proximity score between "A and D". As such, whenever each sentence is analyzed and such pairs of keywords are generated, the number of the pairs may be counted and keywords with a high frequency of appearing together in the same sentence may be set as a combined keyword. A proximity table showing keyword proximity scores among keywords may be generated, keywords with a high degree of proximity in the proximity table may be searched, and the searched keywords may be combined into a combined keyword. If a plurality of combined keywords is generated, the priority may be determined in descending order of degree of proximity.

As such, according to the present embodiment, the collected wish information and keywords are not simply matched, but the keywords are assigned with degrees of importance based on the degree of proximity between keywords and then scored based on the degrees of importance. That is, according to the present embodiment, if wish information includes text such as "I would like to travel to Rome", content information may be matched to the wish information based on a combined keyword "travel to Rome" instead of "travel".

In an example, the front surface region may further include a region for selecting a view switch button located in the rest of the front surface region except for the above-described text region, image region and schedule region. In this example, the processor 140 may provide the device with the double-sided wishing card on which the front surface region is displayed and may receive, from the device, an input to select the region for selecting a view switch button. Then, in response to the input, the processor 140 may provide the device with the double-sided wishing card on which the back surface region is displayed by turning over the double-sided wishing card on which the front surface region is displayed.

In another example, the front surface region may further include a region for selecting a wish list check button located in the rest of the front surface region except for the above-described text region, image region and schedule region. In this example, the processor 140 may provide the device with the double-sided wishing card on which the front surface region is displayed and may receive, from the device, an input to select the region for selecting a wish list check button. Then, in response to the input, the processor 140 may generate reward information and provide the reward information to the device.

Further, when the processor 140 receives, from the device, an input to select the front surface region, the processor 140 may generate a first interface including a region for selecting a wish list planning button, a region for selecting a wish list achievement certification button and a region for another user's wish list information and provide the first interface to the device. When the processor 140 receives, from the device, an input to select the back surface region, the processor 140 may generate a second interface including content description text and content description images corresponding to the content information and provide the second interface to the device. Furthermore, when the processor 140 receives, from the device, an input to select the region for selecting a wish list achievement certification button included in the front surface region, the processor 140 may generate a certification interface including at least one of a certificate and a stamp that confirms what the user has achieved in the wish list and provide the certification interface to the device.

Figure 3:
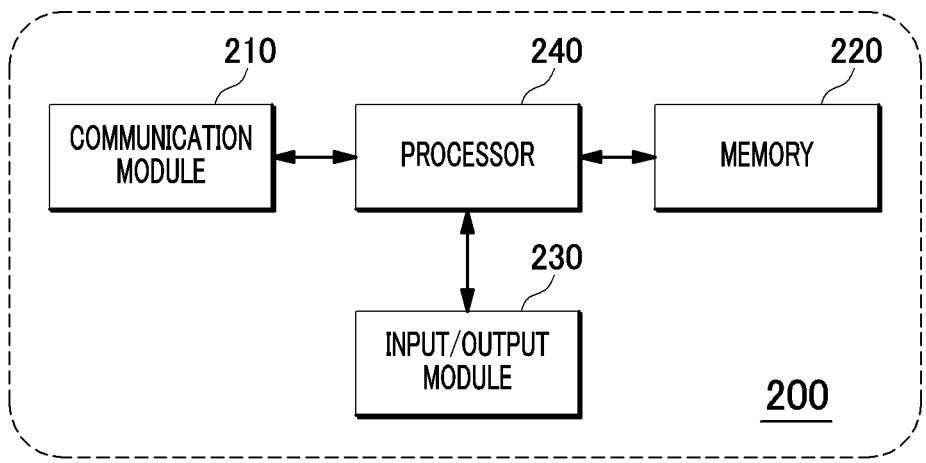
FIG. 3 is a block diagram illustrating a configuration of the user device illustrated in FIG. 1.

FIG. 3 is a block diagram illustrating a configuration of the user device 200 illustrated in FIG. 1.

Referring to FIG. 3, the user device 200 includes an input/output module 230, a memory 220 that stores a wish list management and content recommendation program, and a processor 240 that executes the program stored in the memory 220, and may further include a communication module 210. The communication module 210 transmits and receives information to and from a server. Herein, the server may refer to the above-described wish list-to-content matching service providing system 100.

The processor 240 is configured to execute the wish list management and content recommendation program to perform the following functions and processes.

The processor 240 may receive wish information including text and images regarding the user's wish list through the input/output module 230 and generate keyword information by analyzing morphemes of the text included in the wish information. Also, the processor 140 may generate content information corresponding to the keyword information. The processor 240 may generate a double-sided wishing card including a front surface region configured based on the wish information and a back surface region configured based on the content information and display the double-sided wishing card through the input/output module 230. Herein, the wish information may include description information, associated image information and achievement plan schedule information regarding the user's wish list. The front surface region may include a text region where the description information is located, an image region where the associated image information is located, and a schedule region where the achievement plan schedule information is located. The content information may include advertisement information supplied from, for example, the supplier device 300.

The processor 240 may generate a wish list text interface including a region for writing a description of the user's wish list and display the wish list text interface through the input/output module 230, and may receive description information regarding the user's wish list written in the region for writing a description of the user's wish list through the wish list text interface. The processor 240 may generate a wish list image interface including a region for uploading images of the user's wish list and display the wish list image interface through the input/output module 230, and may receive associated image information regarding the user's wish list uploaded to the region for uploading images of the user's wish list through the wish list image interface. The processor 240 may generate a wish list schedule interface including a region for writing an achievement plan schedule of the user's wish list and display the wish list schedule interface through the input/output module 230, and may receive achievement plan schedule information regarding the user's wish list uploaded to the region for writing an achievement plan schedule of the user's wish list through the wish list schedule interface. The processor 240 may generate a card generation interface including a region for selecting a wishing card generation button and display the card generation interface through the input/output module 230, and may receive, through the card generation interface, inputs to select the region for selecting a wishing card generation button for a predetermined period of time.

The processor 240 may extract keywords by analyzing morphemes of the text included in the description information of the wish list using natural language processing. The processor 240 may calculate the degree of proximity between the extracted keywords based on a predetermined keyword proximity score. The processor 240 may generate a combined keyword by combining keywords having a predetermined proximity score or more among keywords located within a predetermined interval from each other in the text and set the combined keyword as keyword information. The processor 240 may generate content information corresponding to the keyword information using an artificial intelligence model trained to generate content information corresponding to a specific keyword when the specific keyword is input.

In an example, the front surface region may further include a region for selecting a view switch button located in the rest of the front surface region except for the above-described text region, image region and schedule region. In this example, the processor 240 may display, through the input/output module 230, the double-sided wishing card on which the front surface region is displayed. The processor 240 may receive, through the input/output module 230, an input to select the region for selecting a view switch button. Then, in response to the input, the processor 240 may display, through the input/output module 230, the double-sided wishing card on which the back surface region is displayed by turning over the double-sided wishing card on which the front surface region is displayed.

In another example, the front surface region may further include a region for selecting a wish list check button located in the rest of the front surface region except for the above-described text region, image region and schedule region. In this example, the processor 240 may display, through the input/output module 230, the double-sided wishing card on which the front surface region is displayed. The processor 240 may receive, through the input/output module 230, an input to select the region for selecting a wish list check button. Then, in response to the input, the processor 240 may generate reward information and display the reward information through the input/output module 230.

Further, when the processor 240 receives, through the input/output module 230, an input to select the front surface region, the processor 240 may generate a first interface including a region for selecting a wish list planning button, a region for selecting a wish list achievement certification button and a region for another user's wish list information and display the first interface through the input/output module 230. When the processor 240 receives, through the input/output module 230, an input to select the back surface region, the processor 240 may generate a second interface including content description text and content description images corresponding to the content information and display the second interface through the input/output module 230.

Furthermore, when the processor 240 receives, through the input/output module 230, an input to select the region for selecting a wish list achievement certification button included in the front surface region, the processor 240 may generate a certification interface including at least one of a certificate and a stamp that confirms what the user has achieved in the wish list and display the certification interface through the input/output module 230.

Figure 4:
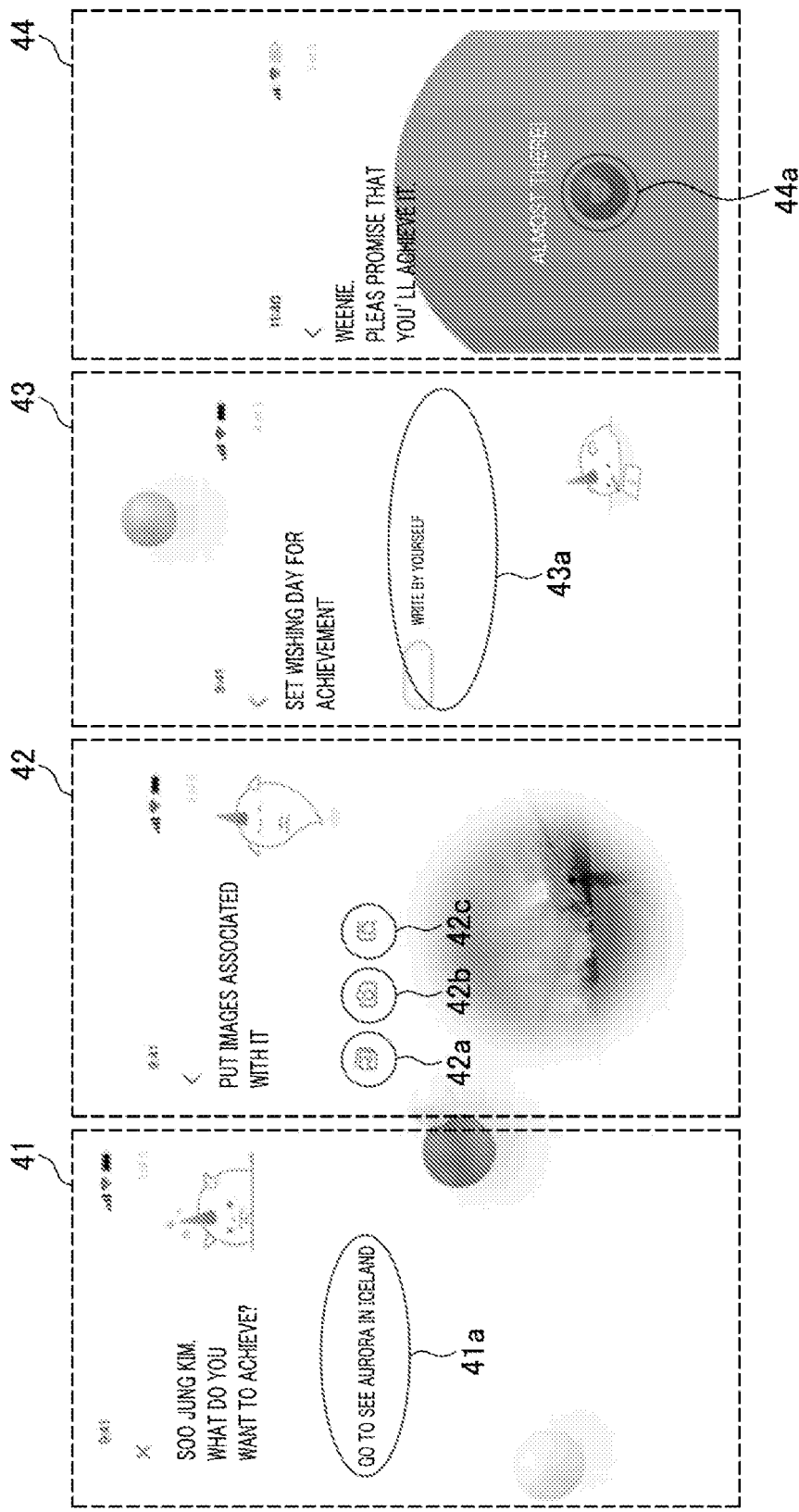
FIG. 4 through FIG. 7 show examples of interfaces provided according to an embodiment of the present disclosure.
Figure 5:
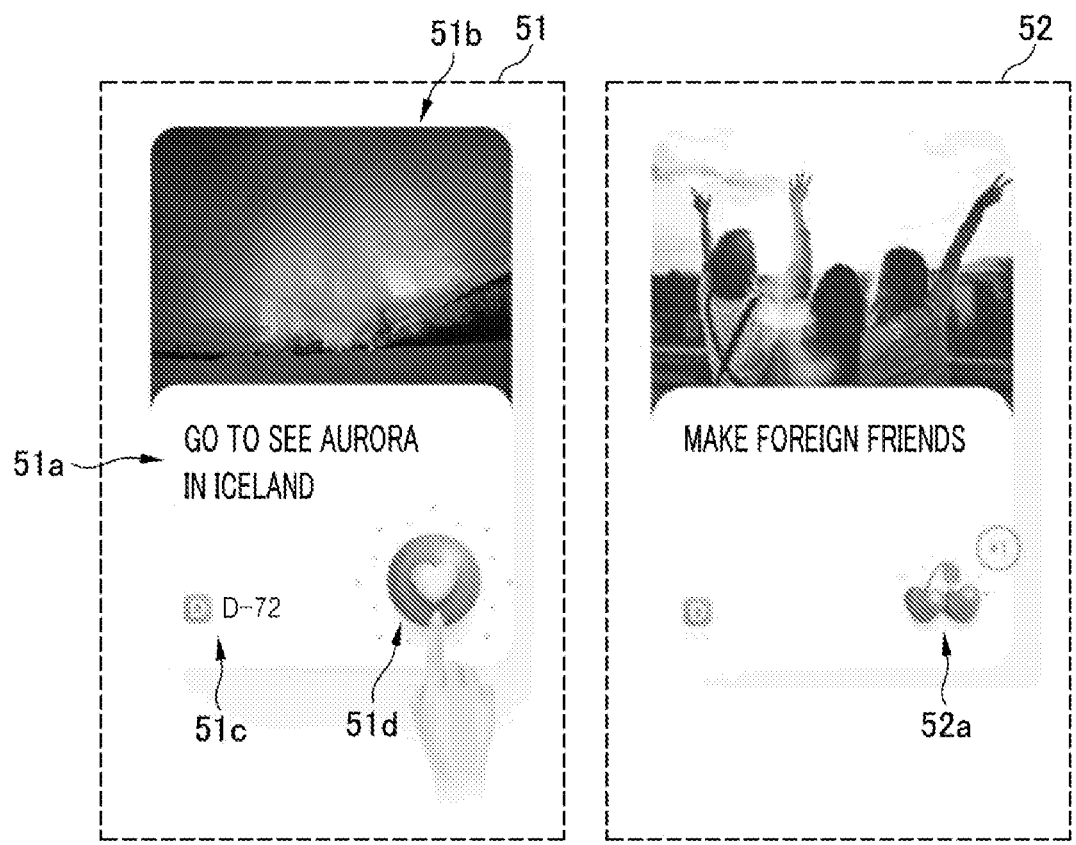
Figure 6:
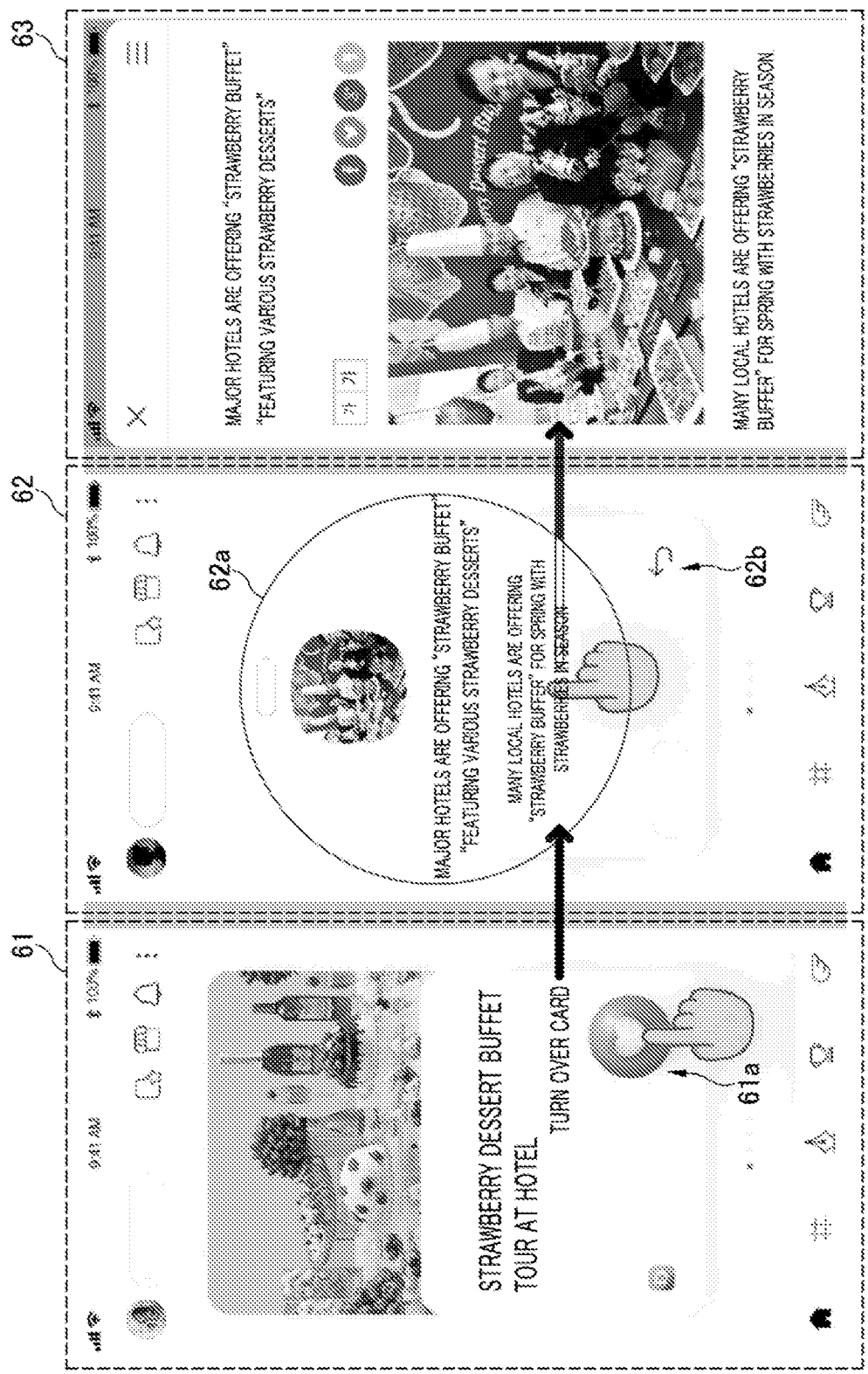
Figure 7:
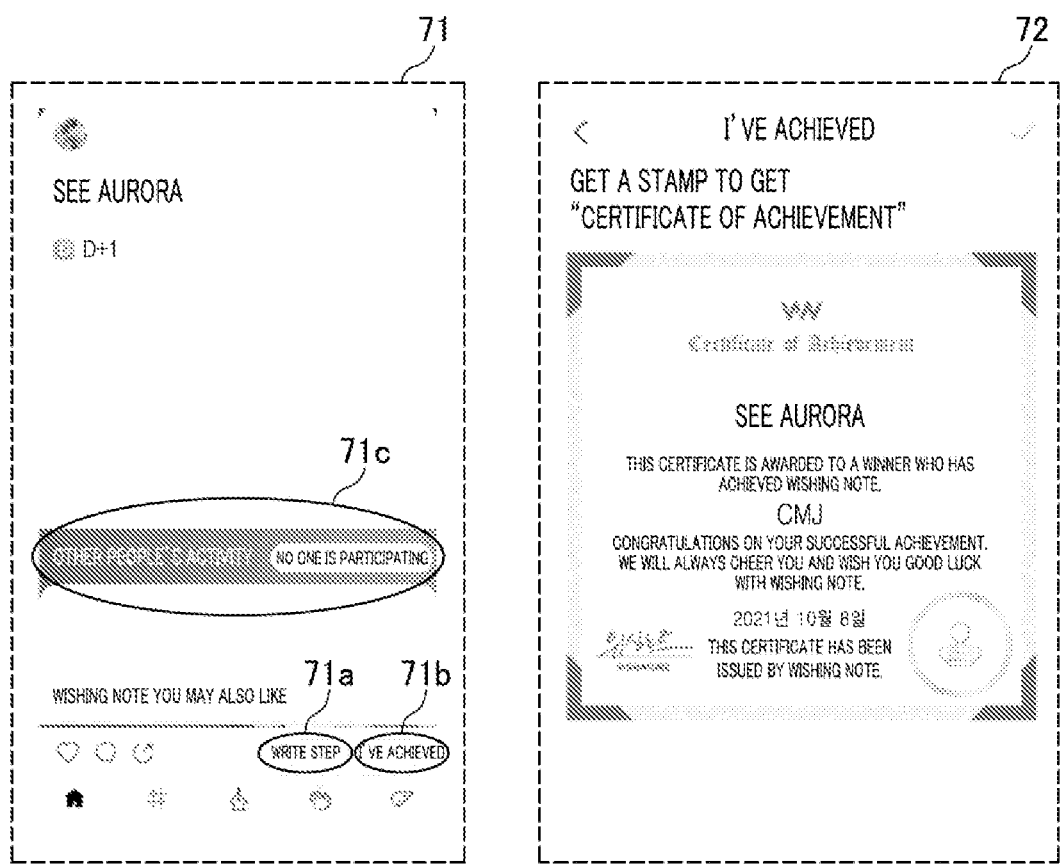

FIG. 4 through FIG. 7 show examples of the interfaces provided according to an embodiment of the present disclosure. Specifically, FIG. 4 shows examples of the wish list text interface, the wish list image interface, the wish list schedule interface and the card generation interface. FIG. 5 shows examples of the front surface region of the wishing card. FIG. 6 shows an example of the back surface region when the front surface region of the wishing card is turned over and an example of an interface when an input to select the back surface region is received. FIG. 7 shows examples of interfaces when an input to select the front surface region of the wishing card is received.

Referring to an example wish list text interface 41 illustrated in FIG. 4, the wish list text interface may include a region 41*a* for writing a description of the user's wish list including the user's wishes and objectives. For example, a description of the wish list, such as "Go to see aurora in Iceland" may be written in the region 41*a*. The wish list text interface may further include various information such as instructions on how to write in addition to the region 41*a* for writing a description. When the user writes description information on his or her wish list using the user device 200 and selects a next button included in the wish list text interface, a wish list image interface may be displayed on the user device 200.

Referring to an example wish list image interface 42 illustrated in FIG. 4, the wish list image interface may include a region for uploading images of the wish list. The region may include a button 42a for uploading images stored in the user device 200, a button 42b for uploading images taken by the user device 200, and a button 42c for uploading images supplied by the server. The images supplied by the server may be previously stored in the wish list-to-content matching service providing system 100 or the user device 200. When the user uploads associated image information on his or her wish list using the user device 200 and selects a next button included in the wish list image interface, a wish list schedule interface may be displayed on the user device 200.

Referring to an example wish list schedule interface 43 illustrated in FIG. 4, the wish list schedule interface may include a region 43a for writing an achievement plan schedule. When the user inputs achievement plan schedule information on his or her wish list using the user device 200 and selects a next button included in the wish list schedule interface, a card generation interface may be displayed on the user device 200.

Referring to an example card generation interface 44 illustrated in FIG. 4, the card generation interface may include a region 44a for selecting a wishing card generation button. When the user presses the region for selecting a wishing card generation button for a predetermined period of time using the user device 200, a wishing card may be generated. In this case, the card generation interface may display that a specific color gradually spreads from the region for selecting a wishing card generation button to an outer periphery of the card generation interface for the period of time while the user presses the region for selecting a wishing card generation button. When the specific color covers the whole card generation interface, the user device 200 may indicate that the generation of the wishing card has been completed.

Referring to an example front surface region 51 illustrated in FIG. 5, the front surface region of the double-sided wishing card may include a text region 51a where description information of the wish list is located, an image region 51b where associated image information is located, a schedule region 51c where achievement plan schedule information is located, and a region 51d for selecting a view switch button. Also, referring to another example front surface region 52 illustrated in FIG. 5, a region 52a for selecting a wish list check button may be located at the same position as the region 51d for selecting a view switch button. When the user selects the region 52a for selecting a wish list check button using the user device 200, a reward icon may be generated and displayed.

Referring to an example front surface region 61 illustrated in FIG. 6, when the user selects a region for selecting a check button using the user device 200, the front surface region may be turned over and the back surface region may be displayed. Referring to an example back surface region 62 illustrated in FIG. 6, the back surface region may include content information corresponding to wish information. When the user selects text, images or the like included in the back surface region using the user device 200, a new interface including content description text and content description images corresponding to the content information may be displayed.

Referring to an example interface 71 of FIG. 7 appearing when an input to select the front surface region of the wishing card is received, the interface may include a region 71a for selecting a wish list planning button, a region 71b for selecting a wish list achievement certification button and a region 71c for another user's wish list information. When the user selects the region for selecting a wish list achievement certification button using the user device 200, a certification interface 71 including at least one of a certificate and a stamp that confirms what the user has achieved in the wish list may be displayed.

Figure 8:
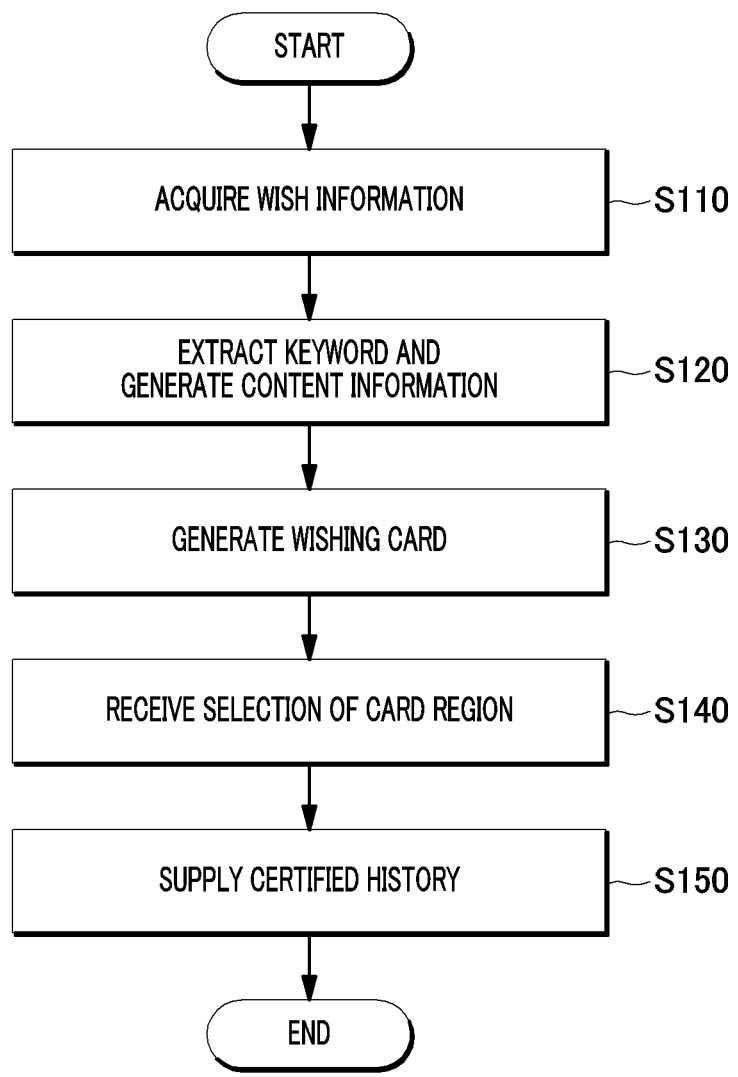
FIG. 8 is a flowchart showing an example process for providing a wish list-to-content matching service according to another embodiment of the present disclosure.

FIG. 8 is a flowchart showing an example process for providing a wish list-to-content matching service according to another embodiment of the present disclosure, and FIG. 9 through FIG. 12 show sub-processes of each process shown in FIG. 8. A method for providing a wish list-to-content matching service to be described below may be performed by the above-described wish list-to-content matching service providing system (100 in FIG. 1). Therefore, the descriptions of the above embodiment of the present disclosure may be identically applied to the following embodiment, and the redundant description thereof will be omitted. In the following embodiment, respective operations may not necessarily be performed in sequence, and the order of respective operations may be changed and the operations may also be performed almost in parallel.

Referring to FIG. 8, the method for providing a wish list-to-content matching service according to the present embodiment provides a wish list-to-content matching service through a communication linkage between a device and a server, and includes a wish information acquisition process S110, a keyword extraction and content information generation process S120, and a wishing card generation process S130. Herein, the device and the server may refer to the above-described user device (200 in FIG. 1) and wish list-to-content matching service providing system (100 in FIG. 1), respectively.

In the wish information acquisition process S110, the server receives wish information including text and images regarding a user's wish list from the device. In the keyword extraction and content information generation process S120, the server generates keyword information by analyzing morphemes of the text included in the wish information and generates content information corresponding to the keyword information. In the wishing card generation process S130, the server generates a double-sided wishing card including a front surface region configured based on the wish information and a back surface region configured based on the content information and provides the double-sided wishing card to the device. The wish information may include description information, associated image information and achievement plan schedule information regarding the user's wish list. The front surface region may include a text region where the description information is located, an image region where the associated image information is located, and a schedule region where the achievement plan schedule information is located. The content information may include advertisement information supplied from another device different from the above-described device.

Figure 9:
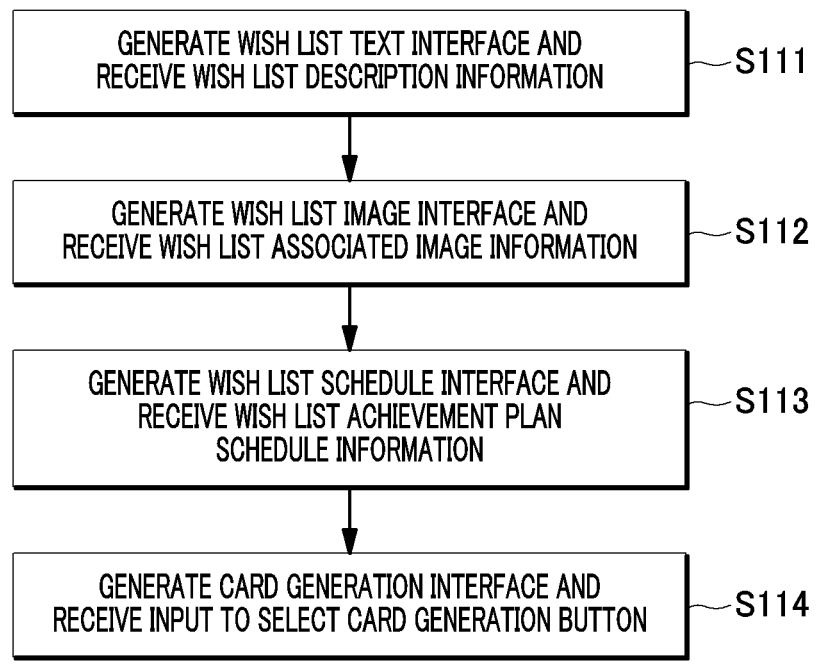
FIG. 9 through FIG. 12 show sub-processes of each process shown in FIG. 8.

Referring to FIG. 9, the wish information acquisition process S110 may include a wish list text interface generation and wish list description information reception process S111, a wish list image interface generation and wish list associated image information reception process S112, a wish list schedule interface generation and wish list achievement plan schedule information reception process S113, and a card generation interface generation and card generation button selection input reception process (S114). In other words, the wish information acquisition process S110 may include a process in which the server generates a wish list text interface including a region for writing a description of the user's wish list, provides the wish list text interface to the device and receives, from the device, description information regarding the user's wish list written in the region for writing a description of the user's wish list through the wish list text interface (S111), a process in which the server generates a wish list image interface including a region for uploading images of the user's wish list, provides the wish list image interface to the device and receives, from the device, associated image information regarding the user's wish list uploaded to the region for uploading images of the user's wish list through the wish list image interface (S112), a process in which the server generates a wish list schedule interface including a region for writing an achievement plan schedule of the user's wish list, provides the wish list schedule interface to the device and receives, from the device, achievement plan schedule information regarding the user's wish list uploaded to the region for writing an achievement plan schedule of the user's wish list through the wish list schedule interface (S113), and a process in which the server generates a card generation interface including a region for selecting a wishing card generation button, provides the card generation interface to the device and receives, from the device, inputs to select the region for selecting a wishing card generation button for a predetermined period of time (S114).

Figure 10:
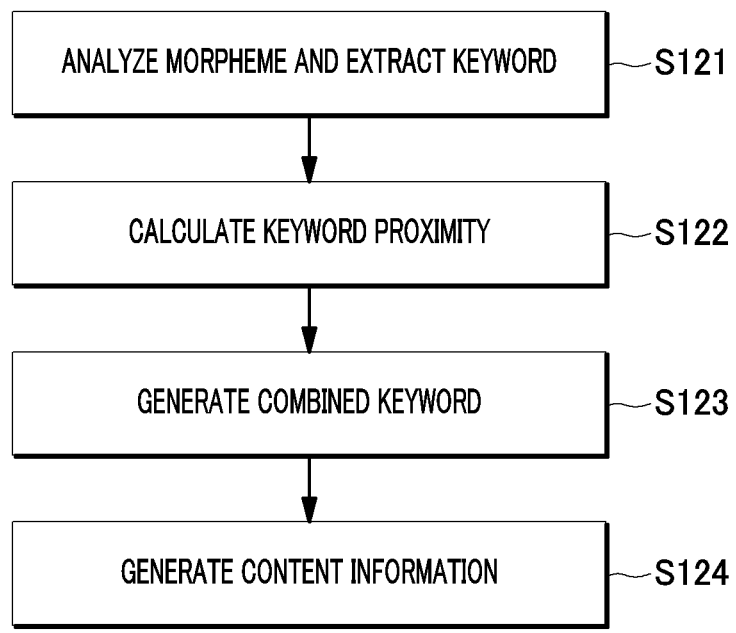

Referring to FIG. 10, the keyword extraction and content information generation process S120 may include a morpheme analysis and keyword extraction process S121, a keyword proximity calculation process S122, a combined keyword generation process S123 and a content information generation process S124. In other words, the keyword extraction and content information generation process S120 may include a process in which the server extracts keywords by analyzing morphemes of the text included in the description information of the wish list using natural language processing (S121), a process in which the server calculates the degree of proximity between the extracted keywords based on a predetermined keyword proximity score (S122), a process in which the server generates a combined keyword by combining keywords having a predetermined proximity score or more among keywords located within a predetermined interval from each other in the text and sets the combined keyword as keyword information (S123), and a process in which the server generates content information corresponding to the keyword information using an artificial intelligence model trained to generate content information corresponding to a specific keyword when the specific keyword is input (S124).

Figure 11:
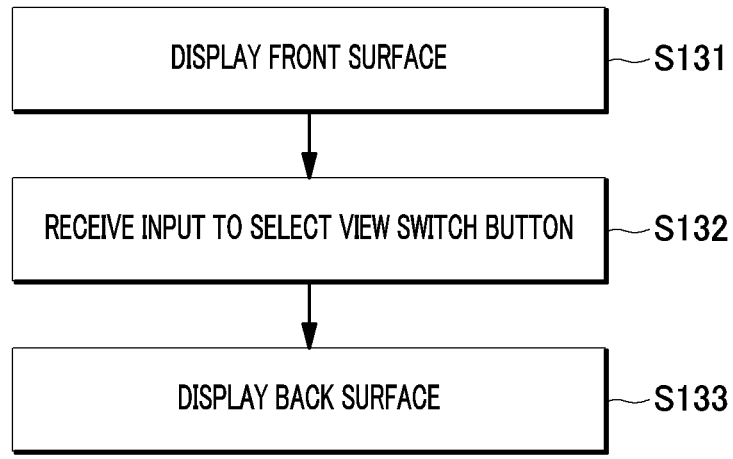

In an example, the front surface region may further include a region for selecting a view switch button located in the rest of the front surface region except for the above-described text region, image region and schedule region. In this case, as shown in FIG. 11, the wishing card generation process S130 may include a front surface display process S131, a view switch button selection input reception process S132, and a back surface display process S133. Specifically, the wishing card generation process S130 may include a process in which the server provides the device with the double-sided wishing card on which the front surface region is displayed (S131), a process in which the server receives, from the device, an input to select the region for selecting a view switch button (132), and a process in which the server provides the device with the double-sided wishing card on which the back surface region is displayed by turning over the double-sided wishing card on which the front surface region is displayed in response to the input (S133).

Figure 12:
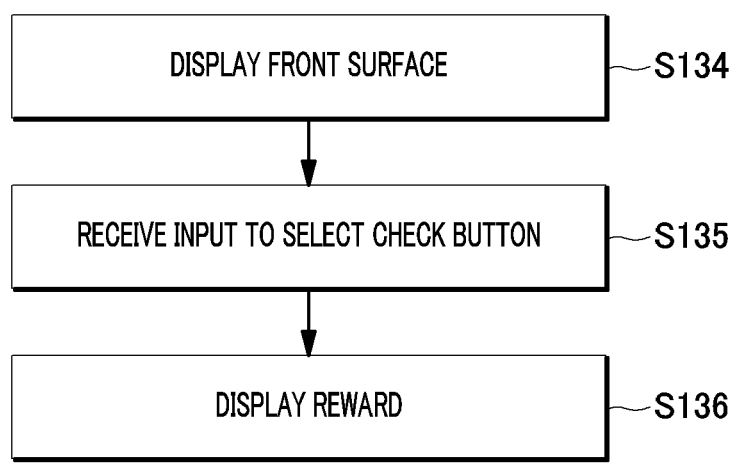

In another example, the front surface region may further include a region for selecting a wish list check button located in the rest of the front surface region except for the above-described text region, image region and schedule region. In this case, as shown in FIG. 12, the wishing card generation process S130 may include a front surface display process S134, a check button selection input reception process S135, and a reward display process S136. Specifically, the wishing card generation process S130 may include a process in which the server provides the device with the double-sided wishing card on which the front surface region is displayed (S134), a process in which the server receives, from the device, an input to select the region for selecting a wish list check button (S135), and a process in which the server generates reward information and provides the reward information to the device in response to the input (S136).

Referring back to FIG. 8, the method for providing a wish list-to-content matching service according to the present embodiment may further include a card region selection reception process S140, and a certified history supply process S150.

In the card region selection reception process S140, when the server receives, from the device, an input to select the front surface region, the server generates a first interface including a region for selecting a wish list planning button, a region for selecting a wish list achievement certification button and a region for another user's wish list information and provides the first interface to the device, and when the server receives, from the device, an input to select the back surface region, the server generates a second interface including content description text and content description images corresponding to the content information and provides the second interface to the device. In the certified history supply process S150, when the server receives, from the device, an input to select the region for selecting a wish list achievement certification button included in the front surface region, the server generates a certification interface including at least one of a certificate and a stamp that confirms what the user has achieved in the wish list and provides the certification interface to the device.

Figure 13:
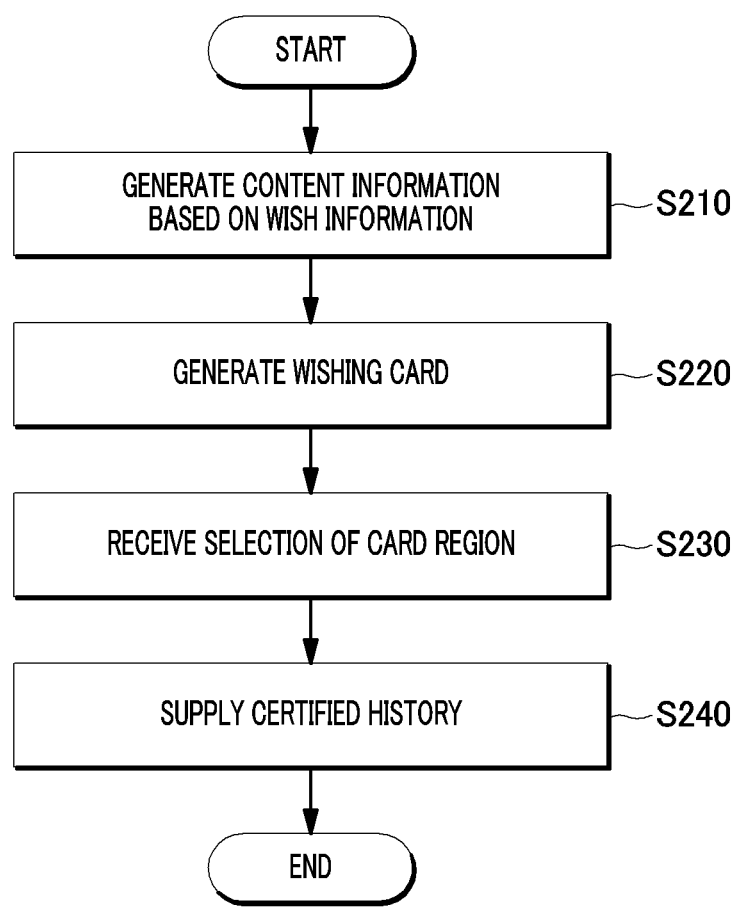
FIG. 13 is a flowchart showing an example process for providing a wish list-to-content matching service according to yet another embodiment of the present disclosure.

FIG. 13 is a flowchart showing an example process for providing a wish list-to-content matching service according to yet another embodiment of the present disclosure, and FIG. 14 through FIG. 17 show sub-processes of each process shown in FIG. 13. A method for providing a wish list-to-content matching service to be described below may be performed by the above-described user device 200. Therefore, the descriptions of the above embodiment of the present disclosure may be identically applied to the following embodiment, and the redundant description thereof will be omitted. In the following embodiment, respective operations may not necessarily be performed in sequence, and the order of respective operations may be changed and the operations may also be performed almost in parallel.

Referring to FIG. 13, the method for providing a wish list-to-content matching service according to the present embodiment provides a wish list-to-content matching service by using the device, and includes a wish information-based content information generation process S210 and a wishing card generation process S220. Herein, the device may refer to the above-described user device (200 in FIG. 1).

In the wish information-based content information generation process S210, the device generates keyword information based on input wish information including text and images regarding the user's wish list by analyzing morphemes of the text included in the wish information and generates content information corresponding to the keyword information. In the wishing card generation process S220, the device generates and displays a double-sided wishing card including a front surface region configured based on the wish information and a back surface region configured based on the content information. The wish information may include description information, associated image information and achievement plan schedule information regarding the user's wish list. The front surface region may include a text region where the description information is located, an image region where the associated image information is located, and a schedule region where the achievement plan schedule information is located. The content information may include advertisement information supplied from another device, e.g., the supplier device 300, different from the above-described device.

Figure 14:
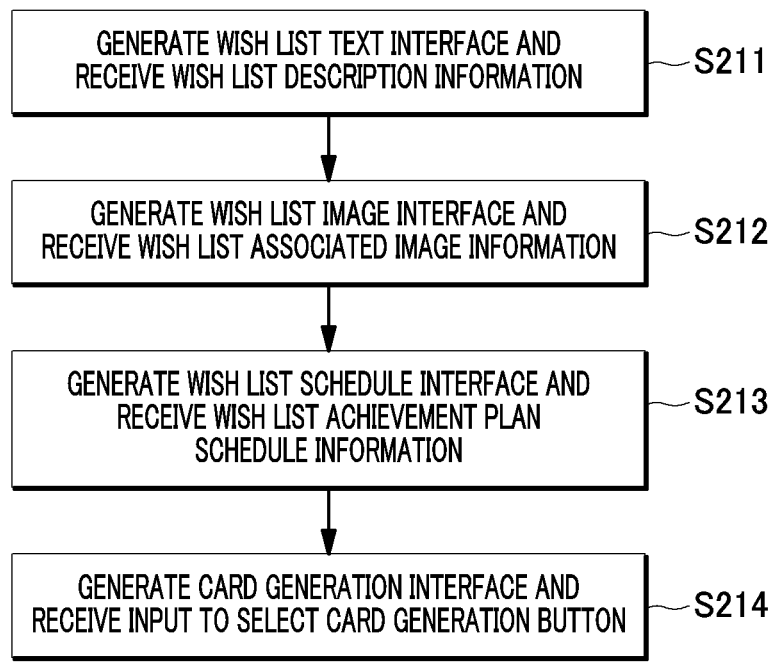
FIG. 14 through FIG. 17 show sub-processes of each process shown in FIG. 13.

Referring to FIG. 14, the wish information-based content information generation process S210 may include a wish list text interface generation and wish list description information reception process S211, a wish list image interface generation and wish list associated image information reception process S212, a wish list schedule interface generation and wish list achievement plan schedule information reception process S213 and a card generation interface generation, and card generation button selection input reception process S214. In other words, the wish information-based content information generation process S210 may include a process in which the device generates a wish list text interface including a region for writing a description of the user's wish list, displays the wish list text interface and receives description information regarding the user's wish list written in the region for writing a description of the user's wish list through the wish list text interface (S211), a process in which the device generates a wish list image interface including a region for uploading images of the user's wish list, displays the wish list image interface and receives associated image information regarding the user's wish list uploaded to the region for uploading images of the user's wish list through the wish list image interface (S212), a process in which the device generates a wish list schedule interface including a region for writing an achievement plan schedule of the user's wish list, displays the wish list schedule interface and receives achievement plan schedule information regarding the user's wish list uploaded to the region for writing an achievement plan schedule of the user's wish list through the wish list schedule interface (S213), and a process in which the device generates a card generation interface including a region for selecting a wishing card generation button, displays the card generation interface and receives, through the card generation interface, inputs to select the region for selecting a wishing card generation button for a predetermined period of time (S214).

Figure 15:
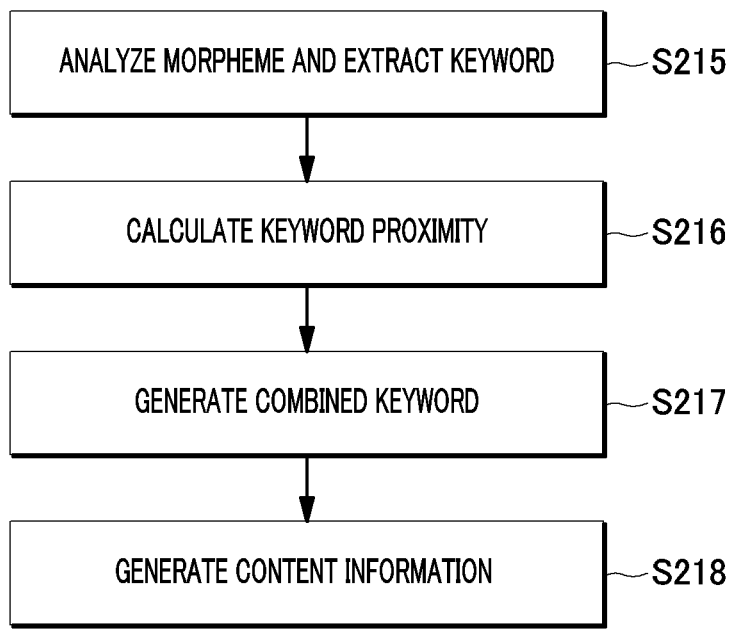

Referring to FIG. 15, the wish information-based content information generation process S210 may include a morpheme analysis and keyword extraction process S215, a keyword proximity calculation process S216, a combined keyword generation process S217 and a content information generation process S218. In other words, the wish information-based content information generation process S210 may include a process in which the device extracts keywords by analyzing morphemes of the text included in the description information of the wish list using natural language processing (S215), a process in which the device calculates the degree of proximity between the extracted keywords based on a predetermined keyword proximity score (S216), a process in which the device generates a combined keyword by combining keywords having a predetermined proximity score or more among keywords located within a predetermined interval from each other in the text and sets the combined keyword as keyword information (S217), and a process in which the device generates content information corresponding to the keyword information using an artificial intelligence model trained to generate content information corresponding to a specific keyword when the specific keyword is input (S218).

Figure 16:
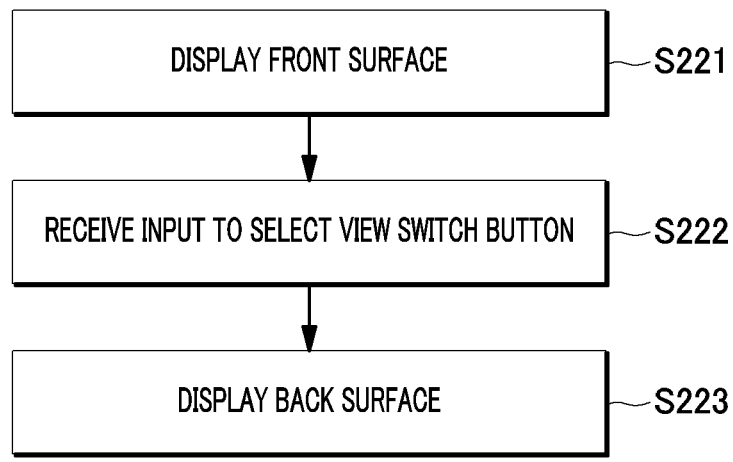

In an example, the front surface region may further include a region for selecting a view switch button located in the rest of the front surface region for the above-described text region, image region and schedule region. In this case, as shown in FIG. 16, the wishing card generation process S220 may include a front surface display process S221, a view switch button selection input reception process S222, and a back surface display process S223. Specifically, the wishing card generation process S220 may include a process in which the device displays the double-sided wishing card on which the front surface region is displayed (S221), a process in which the device receives an input to select the region for selecting a view switch button (222), and a process in which the device displays the double-sided wishing card on which the back surface region is displayed by turning over the double-sided wishing card on which the front surface region is displayed in response to the input (S223).

Figure 17:
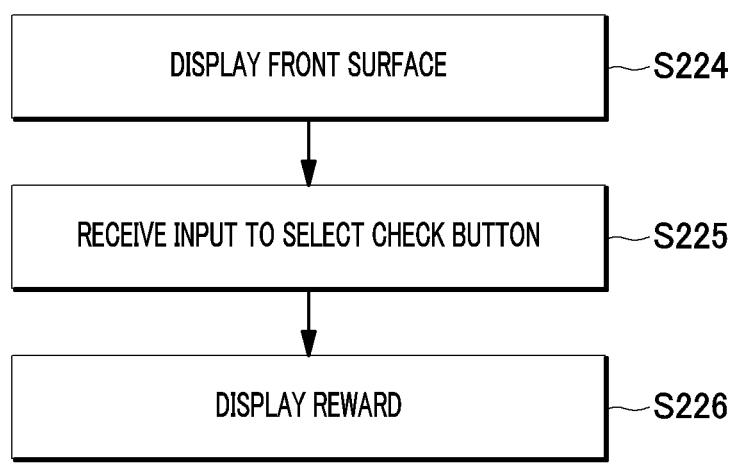

In another example, the front surface region may further include a region for selecting a wish list check button located in the rest of the front surface region except for the above-described text region, image region and schedule region. In this case, as shown in FIG. 17, the wishing card generation process S220 may include a front surface display process S224, a check button selection input reception process S225, and a reward display process S226. Specifically, the wishing card generation process S220 may include a process in which the device displays the double-sided wishing card on which the front surface region is displayed (S224), a process in which the device receives an input to select the region for selecting a wish list check button (S225), and a process in which the device generates and displays reward information in response to the input (S226).

Referring back to FIG. 13, the method for providing a wish list-to-content matching service according to the present embodiment may further include a card region selection reception process S230, and a certified history supply process S240.

In the card region selection reception process S230, when the device receives an input to select the front surface region, the device generates and displays a first interface including a region for selecting a wish list planning button, a region for selecting a wish list achievement certification button and a region for another user's wish list information, and when the device receive an input to select the back surface region, the device generates and displays a second interface including content description text and content description images corresponding to the content information.

In the certified history supply process S240, when the device receives an input to select the region for selecting a wish list achievement certification button included in the front surface region, the device generates and displays a certification interface including at least one of a certificate and a stamp that confirms what the user has achieved in the wish list.

The above-described methods for providing a wish list-to-content matching service according to the embodiments of the present disclosure can be embodied in a storage medium including instruction codes executable by a computer such as a program module executed by the computer. A computer-readable medium can be any usable medium which can be accessed by the computer and includes all volatile/non-volatile and removable/non-removable media. Further, the computer-readable medium may include all computer storage media. The computer storage media include all volatile/non-volatile and removable/non-removable media embodied by a certain method or technology for storing information such as a computer-readable instruction code, a data structure, a program module or other data.

The above description of the present disclosure is provided for the purpose of illustration, and it would be understood by a person with ordinary skill in the art that various changes and modifications may be made without changing technical conception and essential features of the present disclosure. Thus, it is clear that the above-described embodiments are illustrative in all aspects and do not limit the present disclosure. The scope of the present disclosure is defined by the following claims rather than by the detailed description of the embodiment. It shall be understood that all modifications and embodiments conceived from the meaning and scope of the claims and their equivalents are included in the scope of the present disclosure. The scope of the present disclosure is defined by the following claims rather than by the detailed description of the embodiment. It shall be understood that all modifications and embodiments conceived from the meaning and scope of the claims and their equivalents are included in the scope of the present disclosure.

MODE FOR CARRYING OUT THE INVENTION

The mode for carrying out the invention is the same as described above in the detailed description.

INDUSTRIAL APPLICABILITY

The present disclosure relates to a technique for matching content information to a user's wish list including the user's wishes and objectives by analyzing keywords in the wish list and recommending, as information desired by the user, the content information to the user through a wishing card interface, and can be applied to the application industry and user's wish list recommendation industry.

I claim:

1. A method for providing a wish list-to-content matching service through a communication linkage between a device and a server, the method comprising:
   (a) a process of receiving, by the server, a wish information including a text and an image of a user's wish list from the device;
   (b) a process of generating, by the server, keyword information by analyzing morphemes of the text included in the wish information and generating, by the server, content information corresponding to the keyword information; and
   (c) a process of generating, by the server, a double-sided wishing card including a front surface region configured based on the wish information and a back surface region configured based on the content information and providing the double-sided wishing card to the device,
   wherein the wish information includes description information, associated image information and achievement plan schedule information of the user's wish list,
   the front surface region includes a text region where the description information is located, an image region where the associated image information is located, and a schedule region where the achievement plan schedule information is located, and
   wherein the process (b) includes:
   a process in which the server extracts keywords by analyzing morphemes of the text included in the description information of the user's wish list using natural language processing;
   a process in which the server calculates a degree of proximity between extracted keywords based on a predetermined keyword proximity score;
   a process in which the server generates a combined keyword by combining keywords having a predetermined proximity score or more among keywords located within a predetermined interval from each other in the text and sets the combined keyword as keyword information; and
   a process in which the server generates content information corresponding to the keyword information using an artificial intelligence model trained to generate content information corresponding to a specific keyword when the specific keyword is entered.

2. The method for providing the wish list-to-content matching service of claim 1,
   wherein the process (a) includes:
   a process in which the server generates a wish list text interface including a region for writing a description of the user's wish list, provides the wish list text interface to the device and receives, from the device, description information regarding the user's wish list written in the region for writing a description of the user's wish list through the wish list text interface;
   a process in which the server generates a wish list image interface including a region for uploading the image of the user's wish list, provides the wish list image interface to the device and receives, from the device, associated image information regarding the user's wish list uploaded to the region for uploading the image of the user's wish list through the wish list image interface;
   a process in which the server generates a wish list schedule interface including a region for writing an achievement plan schedule of the user's wish list, provides the wish list schedule interface to the device and receives, from the device, achievement plan schedule information regarding the user's wish list uploaded to the region for writing an achievement plan schedule of the user's wish list through the wish list schedule interface; and
   a process in which the server generates a card generation interface including a region for selecting a wishing card generation button, provides the card generation interface to the device and receives, from the device, inputs to select the region for selecting a wishing card generation button for a predetermined period of time.

3. The method for providing the wish list-to-content matching service of claim 1,
   wherein the content information includes advertisement information supplied from another device different from the device.

4. The method for providing the wish list-to-content matching service of claim 1, wherein the front surface region further includes a region for selecting a view switch button located in the front surface region, except for the text region, image region and schedule region, and the process (c) includes:

a process in which the server provides the device with the double-sided wishing card on which the front surface region is displayed;

a process in which the server receives, from the device, an input to select the region for selecting a view switch button; and a process in which the server provides the device with the double-sided wishing card on which the back surface region is displayed by turning over the double-sided wishing card on which the front surface region is displayed in response to the input.

5. The method for providing the wish list-to-content matching service of claim 1, wherein the front surface region further includes a region for selecting a wish list check button located in the front surface region, except for the text region, image region and schedule region, and the process (c) includes:

a process in which the server provides the device with the double-sided wishing card on which the front surface region is displayed;

a process in which the server receives, from the device, an input to select the region for selecting the wish list check button; and a process in which the server generates reward information and provides the reward information to the device in response to the input.

6. The method for providing the wish list-to-content matching service of claim 1, further comprising:

(d) a process in which when the server receives, from the device, an input to select the front surface region, the server generates a first interface including a region for selecting a wish list planning button, a region for selecting a wish list achievement certification button and a region for another user's wish list information and provides the first interface to the device, and when the server receives, from the device, an input to select the back surface region, the server generates a second interface including content description text and content description images corresponding to the content information and provides the second interface to the device.

7. The method for providing the wish list-to-content matching service of claim 6, further comprising:

(e) a process in which when the server receives, from the device, an input to select the region for selecting a wish list achievement certification button included in the front surface region, the server generates a certification interface including at least one of a certificate and a stamp that confirms what a user has achieved in the user's wish list and provides the certification interface to the device.

8. A non-transitory computer-readable storage medium that stores a computer program configured to perform the method for providing a wish list-to-content matching service of claim 1.

9. A system for providing a wish list-to-content matching service through a communication linkage to a device, the system comprising:

a communication module that transmits and receives information to and from the device;

a memory that stores a wish list management and content matching program; and a processor that executes the wish list management and content matching program stored in the memory, wherein the processor is configured to execute the wish list management and content matching program to receive a wish information including a text and an image of a user's wish list from the device, generate keyword information by analyzing morphemes of the text included in the wish information, generate content information corresponding to the keyword information, generate a double-sided wishing card including a front surface region configured based on the wish information and a back surface region configured based on the content information, and provide the double-sided wishing card to the device, wherein the wish information includes description information, associated image information and achievement plan schedule information regarding the user's wish list, the front surface region includes a text region where the description information is located, an image region where the associated image information is located, and a schedule region where the achievement plan schedule information is located, and wherein the processor is further configured to execute the wish list management and content matching program to:

extract keywords by analyzing morphemes of the text included in the description information of the user's wish list using natural language processing;

calculate a degree of proximity between extracted keywords based on a predetermined keyword proximity score;

generate a combined keyword by combining keywords having a predetermined proximity score or more among keywords located within a predetermined interval from each other in the text and set the combined keyword as keyword information; and generate content information corresponding to the keyword information using an artificial intelligence model trained to generate content information corresponding to a specific keyword when the specific keyword is entered.

10. The system of claim 9, wherein the processor is further configured to execute the wish list management and content matching program to:

generate a wish list text interface including a region for writing a description of the user's wish list and provide the wish list text interface to the device;

receive, from the device, description information regarding the user's wish list written in the region for writing a description of the user's wish list through the wish list text interface;

generate a wish list image interface including a region for uploading the image of the user's wish list and provide the wish list image interface to the device;

receive, from the device, associated image information regarding the user's wish list uploaded to the region for uploading the image of the user's wish list through the wish list image interface;

generate a wish list schedule interface including a region for writing an achievement plan schedule of the user's wish list and provide the wish list schedule interface to the device;

receive, from the device, achievement plan schedule information regarding the user's wish list uploaded to the region for writing an achievement plan schedule of the user's wish list through the wish list schedule interface;

generate a card generation interface including a region for selecting a wishing card generation button and provide the card generation interface to the device; and receive, from the device, inputs to select the region for selecting a wishing card generation button for a predetermined period of time.

11. The system of claim 9,
wherein the front surface region further includes a region for selecting a view switch button located in the front surface region, except for the text region, image region and schedule region, and the processor is further configured to execute the wish list management and content matching program to:

provide the device with the double-sided wishing card on which the front surface region is displayed;

receive, from the device, an input to select the region for selecting a view switch button; and provide the device with the double-sided wishing card on which the back surface region is displayed by turning over the double-sided wishing card on which the front surface region is displayed in response to the input.

12. A method for providing a wish list-to-content matching service through a communication linkage between a device and a server, the method comprising:
(a) a process of receiving, by the server, a wish information including a text and an image of a user's wish list from the device;
(b) a process of generating, by the server, keyword information by analyzing morphemes of the text included in the wish information and generating, by the server, content information corresponding to the keyword information; and
(c) a process of generating, by the server, a double-sided wishing card including a front surface region configured based on the wish information and a back surface region configured based on the content information and providing the double-sided wishing card to the device,
wherein the wish information includes description information, associated image information and achievement plan schedule information of the user's wish list,
the front surface region includes a text region where the description information is located, an image region where the associated image information is located, and a schedule region where the achievement plan schedule information is located, and
wherein the process (a) includes:
a process in which the server generates a wish list text interface including a region for writing a description of the user's wish list, provides the wish list text interface to the device and receives, from the device, description information regarding the user's wish list written in the region for writing a description of the user's wish list through the wish list text interface;
a process in which the server generates a wish list image interface including a region for uploading the image of the user's wish list, provides the wish list image interface to the device and receives, from the device, associated image information regarding the user's wish list uploaded to the region for uploading the image of the user's wish list through the wish list image interface;
a process in which the server generates a wish list schedule interface including a region for writing an achievement plan schedule of the user's wish list, provides the wish list schedule interface to the device and receives, from the device, achievement plan schedule information regarding the user's wish list uploaded to the region for writing an achievement plan schedule of the user's wish list through the wish list schedule interface; and
a process in which the server generates a card generation interface including a region for selecting a wishing card generation button, provides the card generation interface to the device and receives, from the device, inputs to select the region for selecting a wishing card generation button for a predetermined period of time.

13. The method for providing the wish list-to-content matching service of claim 12, wherein the process (b) includes:
a process in which the server extracts keywords by analyzing morphemes of the text included in the description information of the user's wish list using natural language processing;
a process in which the server calculates a degree of proximity between extracted keywords based on a predetermined keyword proximity score;
a process in which the server generates a combined keyword by combining keywords having a predetermined proximity score or more among keywords located within a predetermined interval from each other in the text and sets the combined keyword as keyword information; and a process in which the server generates content information corresponding to the keyword information using an artificial intelligence model trained to generate content information corresponding to a specific keyword when the specific keyword is entered.

14. The method for providing the wish list-to-content matching service of claim 12,
wherein the front surface region further includes a region for selecting a wish list check button located in the front surface region, except for the text region, image region and schedule region, and
the process (c) includes:
a process in which the server provides the device with the double-sided wishing card on which the front surface region is displayed;
a process in which the server receives, from the device, an input to select the region for selecting the wish list check button; and
a process in which the server generates reward information and provides the reward information to the device in response to the input.

15. The method for providing the wish list-to-content matching service of claim 12, further comprising:
(d) a process in which when the server receives, from the device, an input to select the front surface region, the server generates a first interface including a region for selecting a wish list planning button, a region for selecting a wish list achievement certification button and a region for another user's wish list information and provides the first interface to the device, and when the server receives, from the device, an input to select the back surface region, the server generates a second interface including content description text and content description images corresponding to the content information and provides the second interface to the device.

16. The method for providing the wish list-to-content matching service of claim 15, further comprising:
(e) a process in which when the server receives, from the device, an input to select the region for selecting a wish list achievement certification button included in the front surface region, the server generates a certification interface including at least one of a certificate and a stamp that confirms what a user has achieved in the user's wish list and provides the certification interface to the device.

\* \* \* \* \*